US006152167A

United States Patent [19]
Baker

[11] Patent Number: 6,152,167
[45] Date of Patent: Nov. 28, 2000

[54] VALVE ACTUATOR WITH EMERGENCY SHUTDOWN FEATURE

[75] Inventor: Gerald Baker, Houston, Tex.

[73] Assignee: Cooper Cameron, Houston, Tex.

[21] Appl. No.: 09/248,660

[22] Filed: Feb. 11, 1999

[51] Int. Cl.[7] .................................................. F16K 17/00
[52] U.S. Cl. ......................................... 137/458; 137/463
[58] Field of Search ..................................... 137/458, 463

[56] References Cited

U.S. PATENT DOCUMENTS

| | | | |
|---|---|---|---|
| 331,544 | 12/1885 | Reinecke | 137/463 |
| 1,466,945 | 9/1923 | Bendix . | |
| 1,784,094 | 12/1930 | Fletcher . | |
| 2,327,980 | 8/1943 | Bryant . | |
| 2,733,729 | 2/1956 | Wolfe | 137/458 |
| 2,930,571 | 3/1960 | Vogl . | |
| 5,261,446 | 11/1993 | Baker | 137/458 |

FOREIGN PATENT DOCUMENTS

| | | | |
|---|---|---|---|
| 616508 | 3/1961 | Canada | 137/458 |
| 51213 | 11/1992 | European Pat. Off. . | |
| 785188 | 3/1956 | United Kingdom . | |
| 1141082 | 5/1966 | United Kingdom . | |
| 1186767 | 4/1970 | United Kingdom . | |
| 1340570 | 12/1973 | United Kingdom . | |
| 2243669 | 11/1991 | United Kingdom . | |
| 2283061 | 4/1995 | United Kingdom . | |
| 2297605 | 8/1998 | United Kingdom . | |

| | | |
|---|---|---|
| WO 80/00483 | 3/1980 | WIPO . |
| WO 96/04494 | 2/1996 | WIPO . |

OTHER PUBLICATIONS

Guiberson AVA Dresser, Model 'SRM' Safely Release Manual Actuator, 5 pages, date unknown.
Baker Oil Tools, Maintenance and Operating Instructions for Model "CSWC" Coil Spring, High Thrust Wire–Cutting Actuator, 6 pages, Nov. 5, 1993.
Otis Engineering Corporation, Guide to Otis Surface Safety Valve Actuators and Accessories, 1 page, Feb. 1993.
Axelson, Axelson Type HC Actuator, 2 pages, date unknown.
Baker Oil Tools, Pneumatic and Hydraulic Actuator drawings, 5 pages.

Primary Examiner—Stephen M. Hepperle
Attorney, Agent, or Firm—Duane, Morris & Heckscher LLP

[57] ABSTRACT

A valve actuator with an emergency shutdown feature incorporates shutdown of the valve when a sensed line pressure is outside of high- and low-pressure trip points. The actuator can be manually tripped. The actuator can be tripped in the event of a fire or, incorporating a solenoid, a trip can be accomplished with an appropriate signal. Once tripped, the actuator requires manual reset. The normal open and closed operation of the valve cooperates with a clutching mechanism which is part of the trip system. The preferred embodiment of the clutching system is a torsion spring or springs which normally allow movement in one direction but not in the other unless acted upon by the tripping system.

12 Claims, 12 Drawing Sheets

VALVE ACTUATOR WITH EMERGENCY SHUTDOWN FEATURE

FIELD OF THE INVENTION

The field of this invention relates to valve actuators such as, for example, those that can move a gate in a gate valve between an open and a closed position and which have features which allow emergency shutdown for a variety of conditions.

BACKGROUND OF THE INVENTION

Control valves and chokes, as well as other types of valves, are frequently used in the oil and gas industry. There are numerous designs of actuators which have been applied to such valves for remote operation. Some actuator designs also incorporate an emergency shutdown feature. The shutdown components can be actuated electrically or hydraulically. Some applications do not have an adjacent available electrical supply or an auxiliary hydraulic system for actuation of the shutdown sequence for the valve. Shutdown systems in such environments have relied on line pressure changes for the shutdown trigger.

U.S. Pat. Nos. 1,466,945; 1,784,094; 2,327,980; 2,930,571; 3,168,841; 3,512,421; 3,518,891; 3,640,140; 3,889,924; 3,921,264; 3,955,792; 4,082,247; 4,090,589; 4,130,030; 4,189,950; 4,256,065; 4,273,307; 4,323,221; 4,436,278; 4,651,969; 4,741,508; 4,749,004; 4,771,643; 4,920,811; 4,920,816; 5,195,721; 5,497,672; EP 0 512 139 A1; WO 80/00483; WO 96/04494; 785,188; 1,141,082; 1,340,570; 1,186,767; GB 2 243 669 A; GB 2 283 061 A; literature on Dresser Model "SRM" Safety Release Manual Actuator; Baker Oil Tools Maintenance and Operating Instructions for Model "CSWC" Coil Spring, High Thrust Wire-Cutting Actuator; and Baker Oil Tools literature on Pneumatic "Piston" Actuator, show generally the variety of types of actuators that have been employed in the past and some executions of shutdown sequences incorporated in those designs. U.S. Pat. No. 5,261,446, issued to the inventor of the present invention, Gerald S. Baker, illustrated a shutdown system involving actuation of a torsion spring which worked with the main closure spring in the actuator to accomplish emergency shutdown. The tripping system for the shutdown modes is illustrated in FIGS. 8–10 of this patent. This system employed a piston-sensing line pressure and a series of complex linkages upon which various spring-loaded plungers would act so as to allow actuation of the tripping mechanism if the sensed line pressure exceeded a high-pressure setpoint or became less than a low-pressure setpoint. One of the problems with the design illustrated in U.S. Pat. No. 5,261,446 is that when the setpoints for tripping upon sensed high or low pressure were set fairly close together, the mechanism was incapable of being reset. As the line pressure rose in an attempt to reset the mechanism in U.S. Pat. No. 5,261,446, the high pressure setpoint trip would also be actuated, precluding resetting of the device. This generally became a problem if the difference between the high- and low-pressure trip points was less than about 400 psi. This problem occurred due to the linkages employed, which had interdependent movements, thus making the reset procedure difficult, if not impossible, for low-differential setpoints for high- and low-pressure trips.

Accordingly, what is needed is an actuator for a valve which can be easily reset and which can be tripped without the need for auxiliary electrical or hydraulic systems. Additionally, an objective of the present invention is to provide independently operating high- and low-pressure trip assemblies where the operation of one trip assembly is independent of the operation of the other. Another objective is to provide alternative shutdown techniques such as, for example, in the event of a fire in the area of a valve mounted to the actuator. Another objective is to provide a compact design to accommodate installations where space is at a premium. Yet another objective is to provide a variety of ways for manually tripping the valve to the closed position. Yet another objective is to retain the valve in the trip position until manually reset. Those and other features of the invention will become more apparent to those skilled in the art from a review of the preferred embodiment and an alternative embodiment described below.

SUMMARY OF THE INVENTION

A valve actuator with an emergency shutdown feature incorporates shutdown of the valve when a sensed line pressure is outside of high- and low-pressure trip points. The actuator can be manually tripped. The actuator can be tripped in the event of a fire or, incorporating a solenoid, a trip can be accomplished with an appropriate signal. Once tripped, the actuator requires manual reset. The normal open and closed operation of the valve cooperates with a clutching mechanism which is part of the trip system. The preferred embodiment of the clutching system is a torsion spring or springs which normally allow movement in one direction but not in the other unless acted upon by the tripping system.

DETAILED DESCRIPTION OF THE PREFERRED EMBODIMENT

Figure 1:
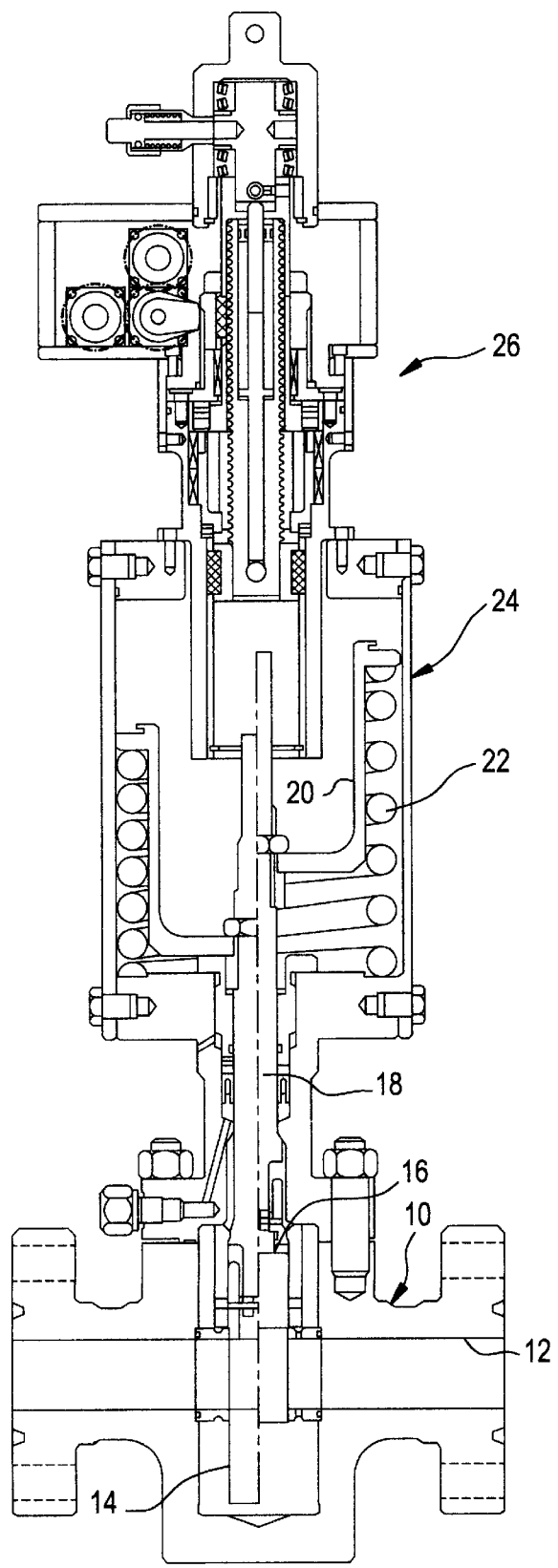
FIG. 1 is a sectional elevational view which shows a split view of both the open and closed positions of the valve.

Referring to FIG. 1, a valve body 10 has a passage 12 and a reciprocally mounted gate 14 shown in the split view in two positions. On the left side of the figure, the gate 14 is extended all the way down, corresponding to the open position for passage 12. On the right-hand half of the figure, the gate 14 is all the way up, moving the passage 16 out of alignment with passage 12, thereby closing off passage 12. Gate 14 is attached to stem 18. A cup 20 is secured to stem 18 and biased by spring 22. A housing 24 surrounds spring 22. The actuation assembly 26 is mounted to the housing 24.

Figure 2:
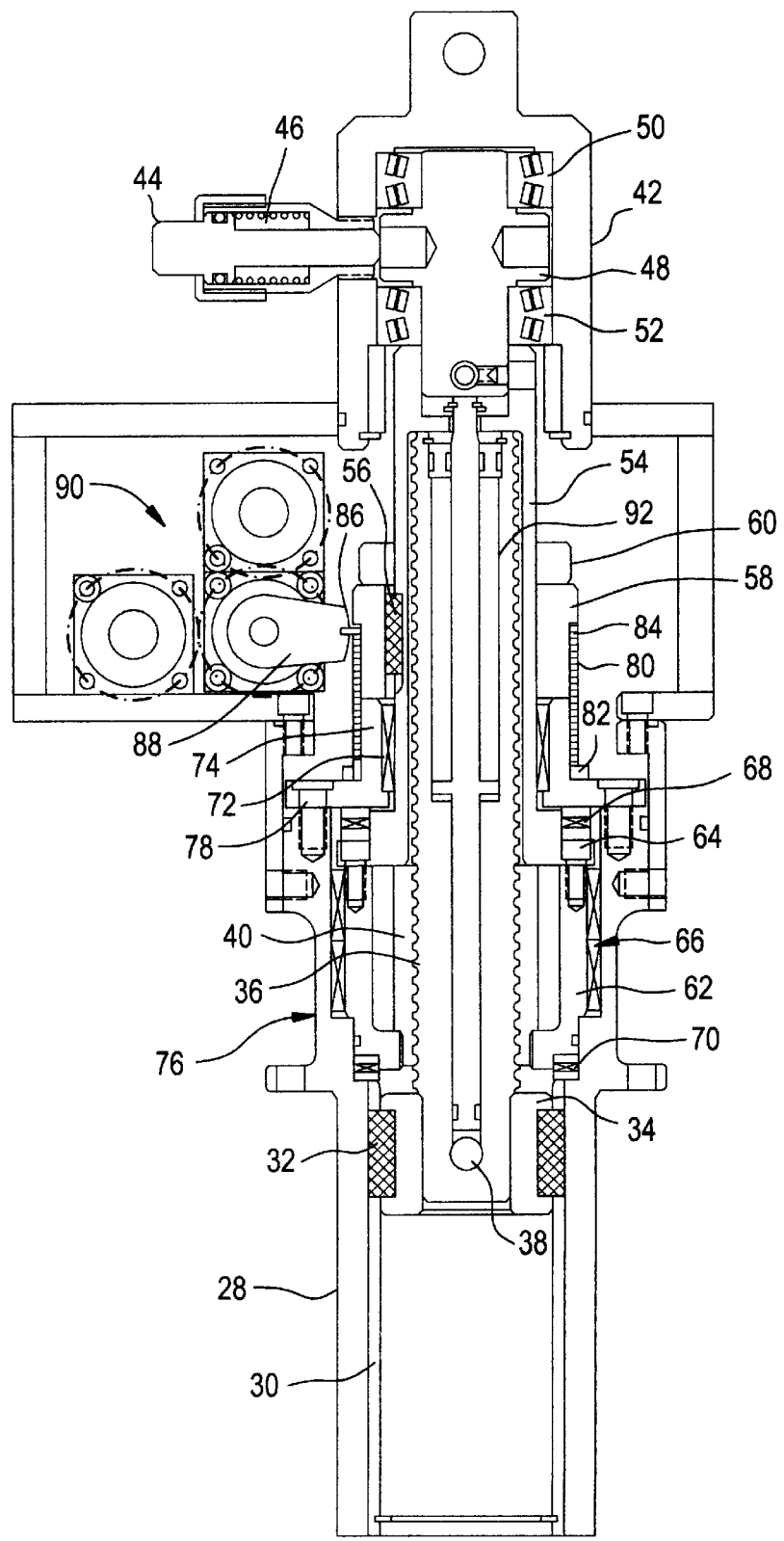
FIG. 2 shows the actuator stem in the up position, corresponding to the closed position of the valve.
Figure 3:
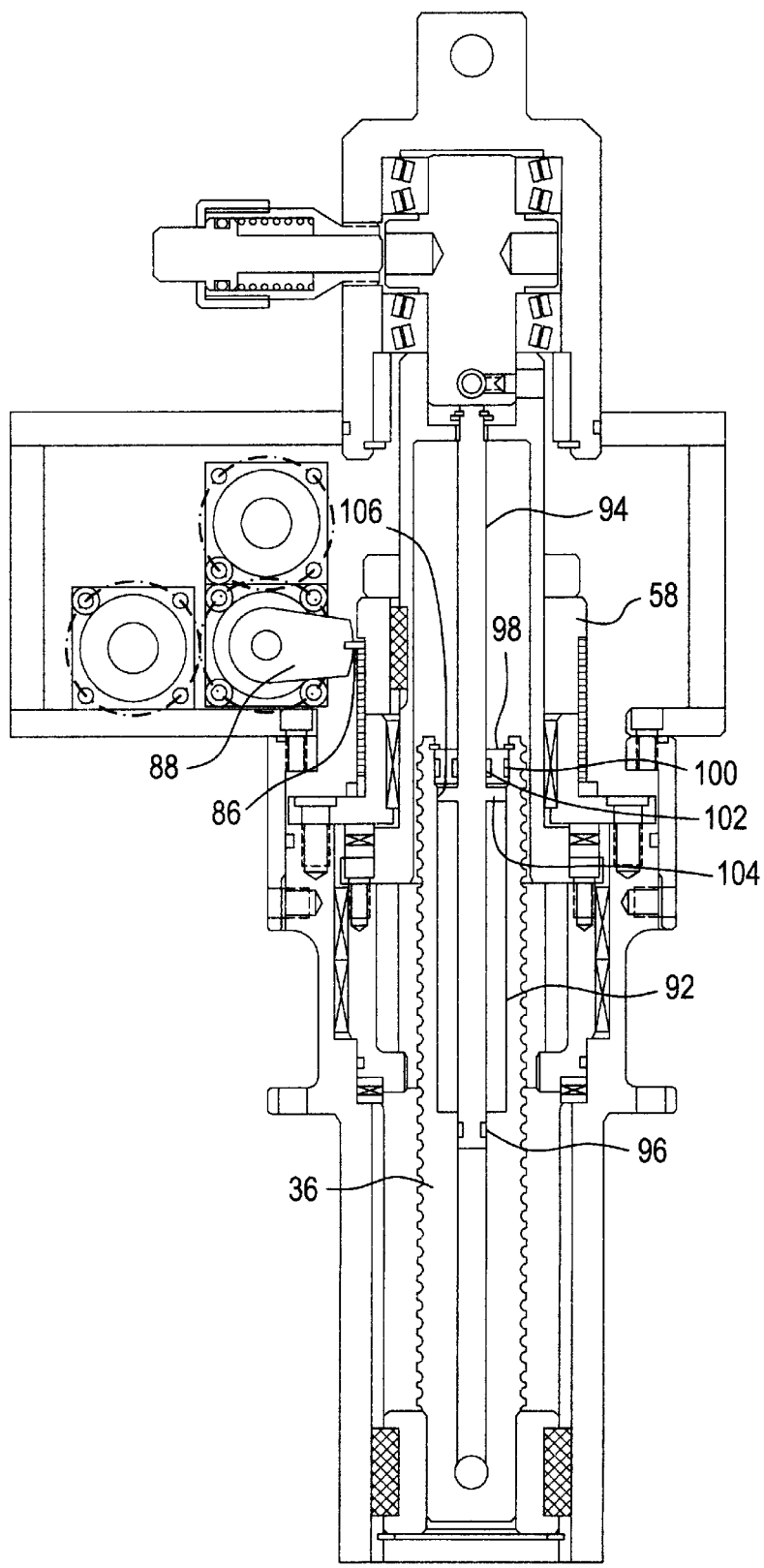
FIG. 3 shows the actuator stem in the down position, corresponding to the open position of the valve.

The actuation assembly 26 in its two positions is shown in FIGS. 2 and 3. A lower head 28 has guide grooves 30 which accept a key 32, which is in turn connected to a shaft adapter 34. The threaded screw 36 is pinned to the shaft adapter 34 by pin 38. Screw 36 is thus confined to longitudinal movements only due to keys 32 extending in grooves 30.

Ball nut 40 interacts with threaded screw 36 through a series of balls (not shown). Those skilled in the art will understand that rotation of the ball nut 40 will result in translation of the threaded screw 36. In the position shown in FIG. 2, the passage 12 in the valve body 10 is closed. In order to open the passage 12, drive cap 42 must be rotated after depressing pin 44 against the force of spring 46. Once the pin 44 is depressed and drive cap 42 is turned counterclockwise, adapter stem 48 will turn in tandem with drive cap 42. Adapter stem 48 is mounted on bearings 50 and 52 above and below, respectively. Adapter stem 48 is also connected to drive stem 54, which has a key 56 connecting it to rotor 58 for tandem rotation. Locking sleeve 60 holds the rotor 58 to the drive stem 54. Ball nut adapter 62 is secured to drive stem 54 at fastener 64. Ball nut adapter 62 rotates on radial bearings 66 and is held from above and below, respectively, by thrust bearings 68 and 70. Radial bearing 72 facilitates rotation of drive stem 54.

Clutch stator 74 is secured to body 76 by fasteners 78,. Mounted over clutch stator 74 and rotor 58 is coiled spring 80, which is wound counterclockwise. The lower end 82 of coiled spring 80 is fixed to the clutch stator 74. The upper end 84 of coiled spring 80 has a protruding tab 86. Tab 86 is engaged by tab 88, which is part of the shutdown system 90. The shutdown system 90 will be described in more detail in the discussion relating to FIGS. 4–9. It should be noted at this time that unless tab 88 has contacted tab 86 and displaced it, the coiled spring 80 will only permit rotation of rotor 58 and along with it, drive stem 54 and adapter stem 48 in a counterclockwise rotation. Counterclockwise rotation beginning at drive cap 42 with pin 44 depressed, ultimately results in counterclockwise rotation of ball nut 40, which causes threaded screw 36 to translate downwardly to the position shown in FIG. 3, where the passage 12 in valve body 10 will be wide open. Reverse rotation of the assembly, beginning with drive cap 42 and ending at ball nut 40, is prevented by coiled spring 80. However, as will be explained with regard to FIGS. 4–9, movement of tab 88 against tab 86, in effect, increases the diameter of coiled spring 80 in order to permit clockwise rotation of rotor 58 and all the components which move in tandem with it. Coiled spring 80 has a slight interference fit over the rotor 58, and counterclockwise rotation tends to increase its diameter, thus allowing rotor 58 to turn counterclockwise. However, in attempts to turn the rotor 58 clockwise, the coiled spring 80 binds tightly onto the rotor 58, locking it to the stator 74. Those skilled in the art will appreciate that in order to close the valve, tab 86 will have to be pushed in a direction to increase the diameter of coiled spring 80, whereupon the return spring 22 (see FIG. 1) pushes on cup 20, translating up stem 18 which abuts threaded screw 36. Threaded screw 36 can then translate, which results in a clockwise rotation of ball nut 40 and all the components connected to it up to and including adapter stem 48. Since the pin 44 is not depressed during the clockwise rotation of ball nut 40, the drive cap 42 does not rotate as the gate 14 moves to the position where passage 12 is closed.

Threaded screw 36 has a bore 92 through which extends a dampener rod 94. Bore 92 is sealed by seal 96 near the lower end of rod 94. A cap 98 with seals 100 and 102 seals off the upper end of bore 92. Rod 94 has a circumferential projection 104 which defines a narrow bypass passage 106 about its outer periphery or, alternatively, directly through projection 104. Thus, movement of the threaded screw 36 is regulated by the size of the opening past projection 104 as the threaded screw 36 moves in either direction. Normally, when opening the valve by turning drive cap 42 counterclockwise, the movement is sufficiently slow so that the dampening effect of rod 94 in bore 92 is not noticed. However, on closure to prevent slamming of the parts, the movement of threaded screw 36 is controlled by the passage or passages 106 around or through the circumferential projection 104 such that the rate of movement of threaded screw 36, upon urging by closure spring 22, is regulated.

The primary components for normal operation of the illustrated valve having been described, including motion from open to closed during normal operations, the emergency shutdown system 90 will now be described using FIGS. 4–9.

Figure 4:
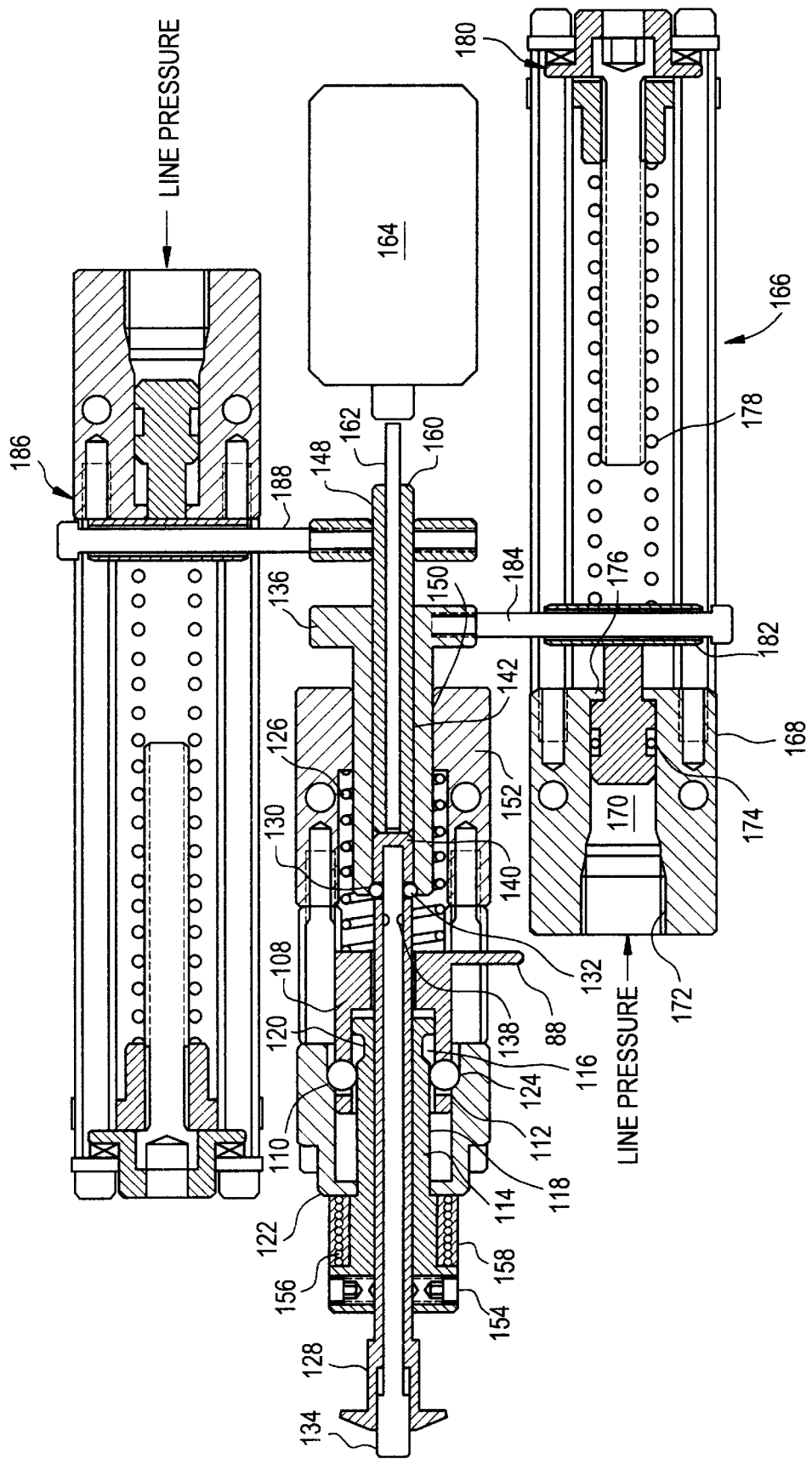
FIG. 4 shows the tripping system which ultimately engages the torsion spring in its normal position.

Referring first to FIG. 4, the tab 88 is illustrated in order to orient the reader. The components of the actuation assembly 26 are omitted in FIGS. 4–9 for clarity. However, it should be understood that movement of tab 88 to the left will have the effect of moving tab 86 in the direction that increases the diameter of coiled spring 80 to initiate the shutdown sequence previously described. Tab 88 is a portion of tripping sleeve 108. Balls 110 are disposed in openings 112 in tripping sleeve 108. Clutch release sleeve 114 fits inside a bore 116 which extends partway into one end of tripping sleeve 108. Clutch release sleeve 114 has an outer surface 118 and a groove 120. Head 122 fits over tripping sleeve 108 and has an internal shoulder 124. When surface 118 of clutch release sleeve 114 is in contact with balls 110, as shown in FIG. 4, balls 110 extend sufficiently outwardly to engage shoulder 124, thus preventing movement of tripping sleeve 108 to the left. A spring 126 biases the tripping sleeve 108 to the left, thus holding the balls 110 against shoulder 124 in the view of FIG. 4. Extending completely through clutch release sleeve 114 and tripping sleeve 108 is ball lock pin 128. Ball lock pin 128 has a series of openings 130, each of which contains a ball 132. A plunger 134 fits through ball lock pin 128 and supports balls 132 in an outwardly extending position shown in FIG. 4 such that they engage low trip release pin 136. Balls 132 can be retracted for reasons which will be explained below when grooves 138 on the plunger 134 are moved into alignment with balls 132, thus allowing them to retract inwardly into ball lock pin 128. Ball lock pin 128 has a closed lower end 140 which is disposed in a bore 142 of low trip release pin 136. High trip release pin 148 extends through bore 142 of low trip release pin 136 and into contact with lower end 140 of ball lock pin 128. Low trip release pin 136 extends through a bore 150 in body 152. Spring 126 bears on one end against body 152 and on the other end against tripping sleeve 108.

Clutch release sleeve 114 moves in tandem with ball lock pin 128 due to the pin connection 154. A spring 156 is held in a compressed state by a eutectic material 158. As will be described below, in the event of a fire in the locality of the shutdown system 90, the eutectic material 158 will release its hold on spring 156, forcing clutch release sleeve 114 to be biased to the left, bringing groove 120 into alignment with balls 110, whereupon spring 130 can bias the tripping sleeve 108 for a shutdown.

High trip release pin 148 has a bore 160 through which extends trip rod 162. A solenoid or some other actuating mechanism 164 abuts to trip rod 162 to selectively actuate it into ball lock pin 128, which in turn forces clutch release sleeve 114 to move, placing groove 120 adjacent balls 110, thus allowing tripping sleeve 108 to be biased by spring 126 for closure of passage 12.

Low-pressure trip assembly 166 comprises a body 168, having a piston 170 mounted in bore 172, with a peripheral seal 174. An internal shoulder 176 in body 168 represents the travel limit of piston 170 when exposed to line pressure connected to passage 12, generally on the downstream side. Such line pressure is connected to bore 172. Acting against line pressure on piston 170 is the force of spring bias from spring 178. An adjuster mechanism 180 allows the preload on spring 178 to be changed to alter the low-pressure trip point of the system. Connected to piston 170 is flat disc 182 which has extending through it a rod 184, one end of which extends into low trip release pin 136. Comparing FIG. 4 with FIG. 5, it can be seen that if the line pressure acting on piston 170 falls below the force of spring 178 acting on flat disc 182, which abuts piston 170, then disc 182 and piston 170 move to the left, taking with them the low trip release pin 136 by virtue of the connection provided by rod 184.

The high-pressure trip assembly 186 is preferably identical in operation to the low-pressure trip assembly 166. Thus, its individual components will not be described again. The only difference is that the orientation of high-pressure trip assembly 186 is in a reverse direction from the orientation of the low-pressure trip assembly 166. Both assemblies 166 and 186 sense line pressure downstream of the valve. However, a buildup in that pressure results in movement to the left or toward body 152 by high trip release pin 148. This is because rod 188 translates to the left when line pressure exceeds the force of the calibration spring 178', thus moving high trip release pin 148 without affecting the position of low trip release pin 136. This occurs because the high trip release pin 148 extends through a bore 142 in low pressure release pin 136.

Figure 5:
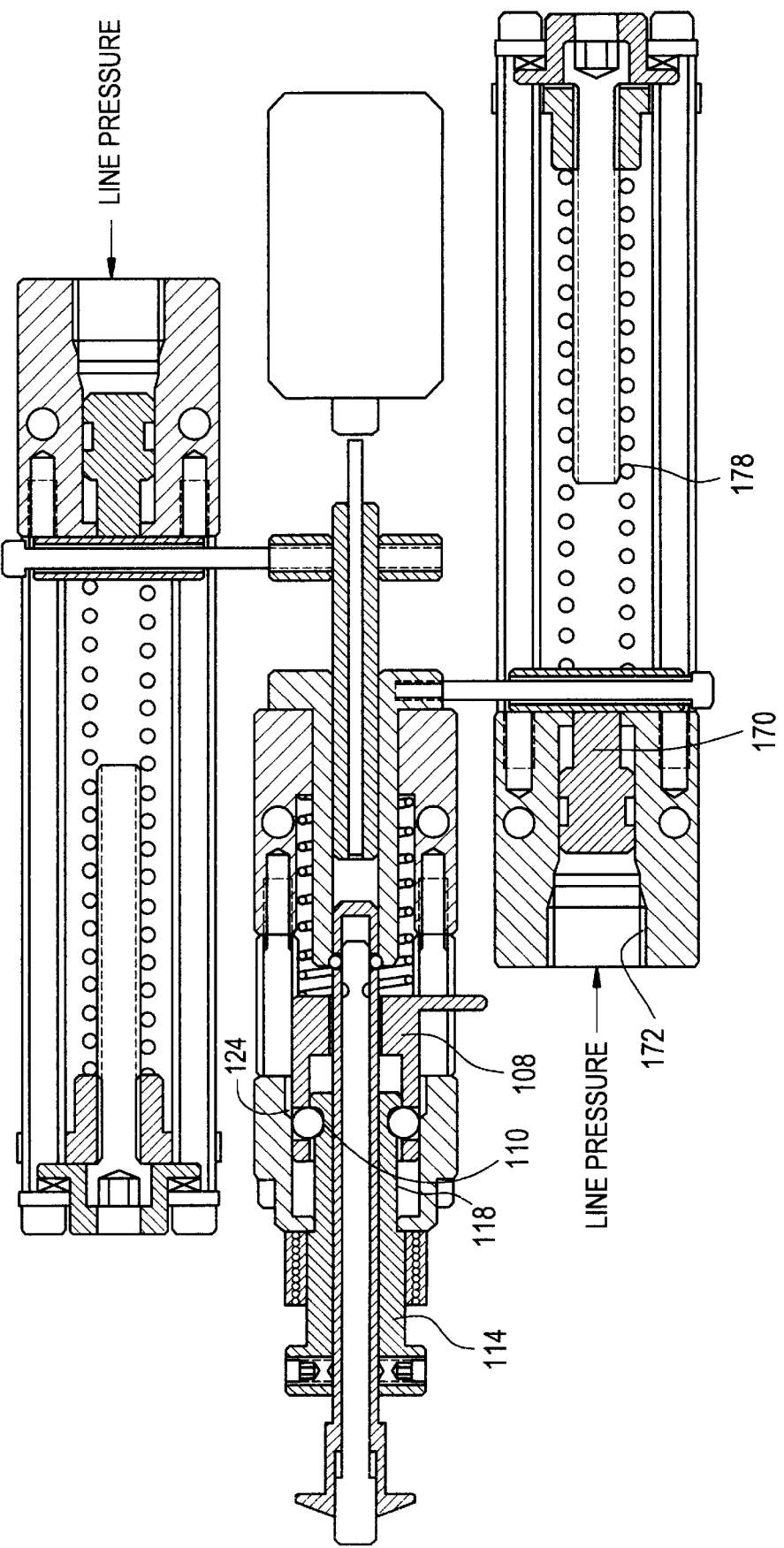
FIG. 5 shows the system of FIG. 4 in the condition where a low-pressure trip has occurred just before the tab moves the torsion spring.

The significant components of the emergency shutdown system 90 now having been described, the specific available shutdowns will now be discussed in more detail. A low-pressure trip is illustrated in FIG. 5. There, the line pressure which is connected to bore 172 decreases to the point where spring 178 can push the piston 170 to the left, as shown by comparing FIGS. 4 and 5. When the piston 170 is pushed to the left, the low-trip release pin 136 also moves to the left, taking with it the clutch release sleeve 114. When the grooves 120 align with balls 110, the tripping sleeve 108 is no longer locked against internal shoulder 124, and the spring 126 biases the tripping sleeve 108 to the left. This takes tab 88 against tab 86 on coiled spring 80. Movement of tab 86 increases the diameter of coiled spring 80, thus allowing the return spring 22 to push the threaded screw 36 upwardly as ball nut 40 and the components connected to it rotate clockwise.

Figure 6:
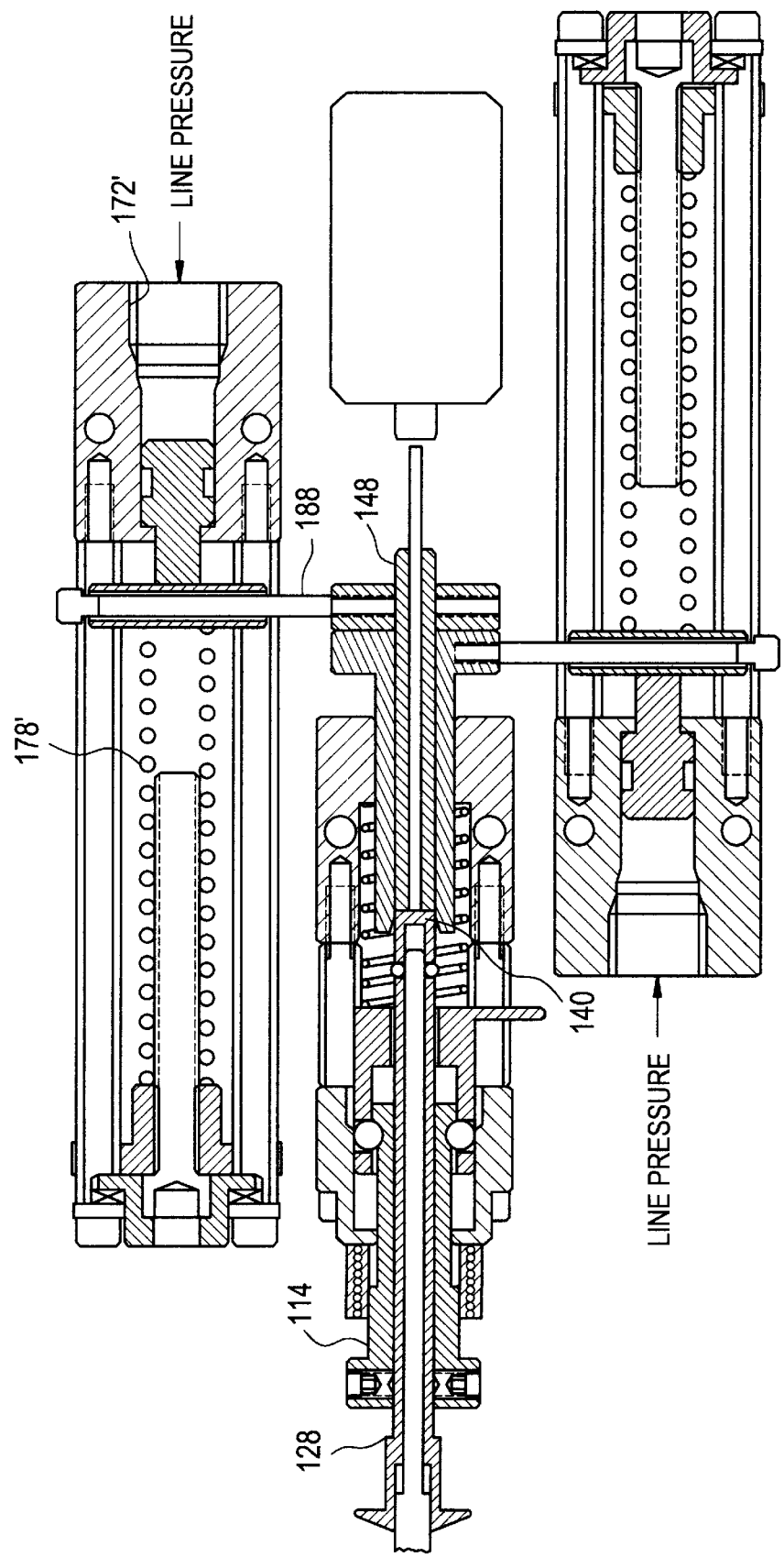
FIG. 6 is the view of FIG. 4, showing a high-pressure trip just before the tab moves the torsion spring.

A high-pressure trip is illustrated in FIG. 6. When pressure in bore 172' exceeds the force provided by spring 178', rod 188 moves to the left toward lower end 140 of ball lock pin 128. Ultimately, the ball lock pin 128 is displaced by high trip release pin 148 in response to movement of rod 188. Movement of the ball lock pin 128 takes with it clutch release sleeve 114 to eventually put groove 120 into alignment with balls 110, allowing them to retract away from shoulder 124. When that occurs, the spring 126 can bias the tripping sleeve 108, thus forcing tab 88 to engage tab 86 on coiled spring 80 for a release of rotor 58. Thereafter, the return spring 22 drives the threaded screw 36 upwardly as the ball nut 40 and those components attached to it rotate clockwise. In both the high and low trips, the passage 12 in the valve remains closed, and the shutdown system 90 must be reset in order to allow the passage 12 to be reopened.

Figure 7:
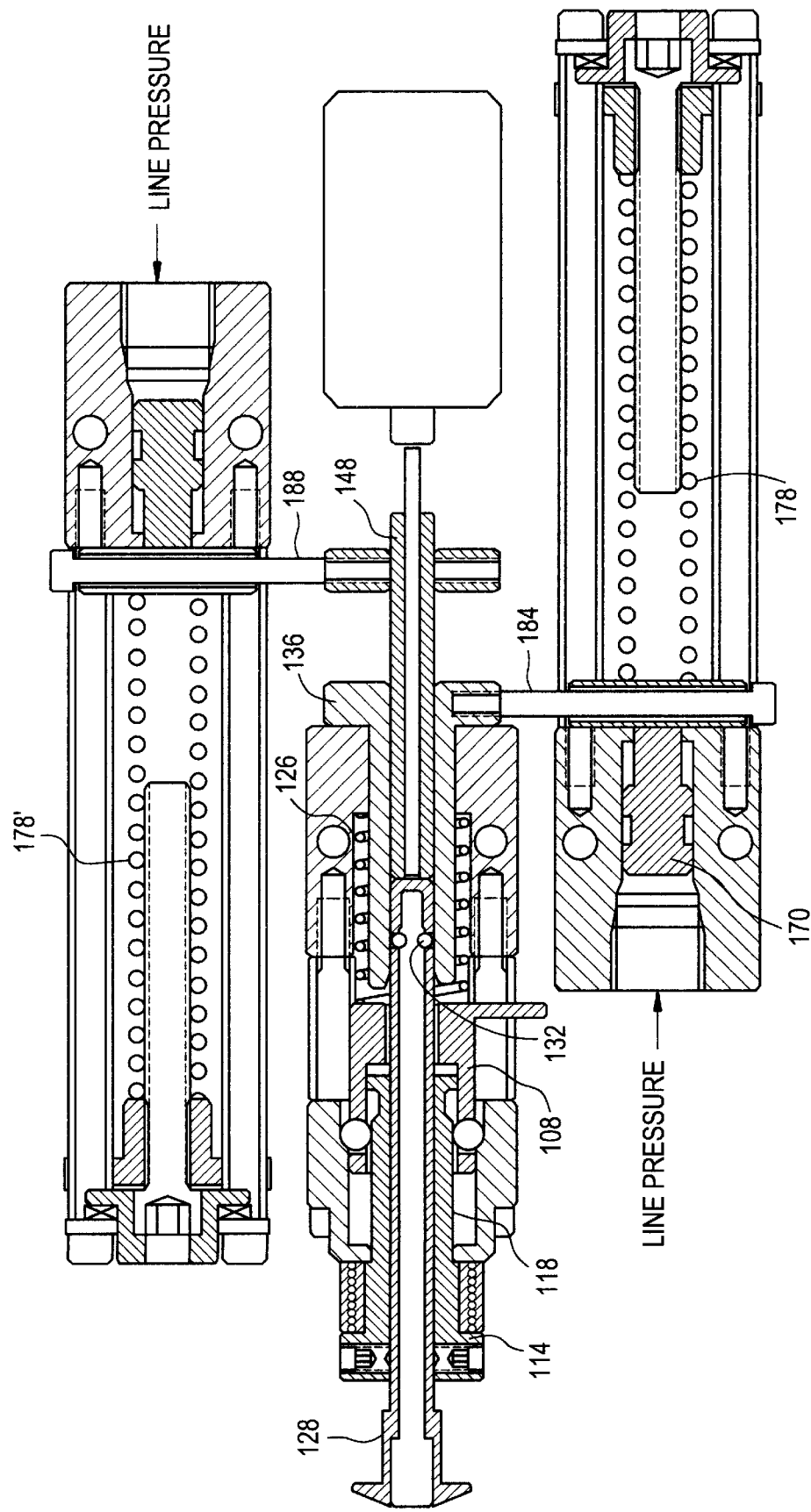
FIG. 7 is the view of FIG. 4, indicating the reset technique of pushing in a button on a manual plunger.

The reset procedure is illustrated in FIG. 7. FIG. 7 illustrates the position which occurs after a low trip as previously described, which results in movement to the left of rod 184, taking with it low trip release pin 136. Those skilled in the art will appreciate that even if a high trip occurs, moving rod 188 to the left, the passage 12 and the valve will close, thus reducing the sensed pressure to a point below the setpoint for the low trip. Thus, as line pressure adjacent the passage 12 is reduced at the point where it is sensed, the return spring 178' will move the rod 188 back to its normal position shown in FIG. 4. At the same time as the line pressure is reduced, where sensed, due to the closure of passage 12, a low trip occurs, allowing spring 178 to move rod 184 to the left. Accordingly, when it is time to reset, FIG. 7 indicates the positions of rods 184 and 188. In order to reset, the plunger 134 is depressed, thus allowing balls 132 to retract within ball lock pin 128. FIG. 7 shows the ball lock pin advanced fully until it has come in contact with high trip release pin 148. However, when a trip occurs, the position initially of the ball lock pin 128 is further out. Pushing in ball lock pin 128 moves with it clutch release sleeve 114, as well as tripping sleeve 108. Referring to FIG. 5, it can be seen that until the balls 110 clear the internal shoulder 124, movement of clutch release sleeve 114 will also result in movement of the tripping sleeve 108. Eventually, balls 110 clear shoulder 124, thus allowing outer surface 118 to come in contact with balls 110, effectively pushing them radially outwardly so that they now can engage the shoulder 124 by virtue of the fact of bias on tripping sleeve 108 from spring 126. Depressing the plunger 134 allows the ball lock pin 128 to advance within low trip release pin 136 sufficiently so that the balls 110 can become relocked onto shoulder 124. It should be noted that as these movements are occurring, the low trip release pin 136 does not move. The emergency shutdown system 90 is now reset. When line pressure resumes and clears the low pressure setpoint, the spring 178 is overcome by the force behind piston 170, thus moving rod 184 to the right to the position again shown in FIG. 4.

Figure 8:
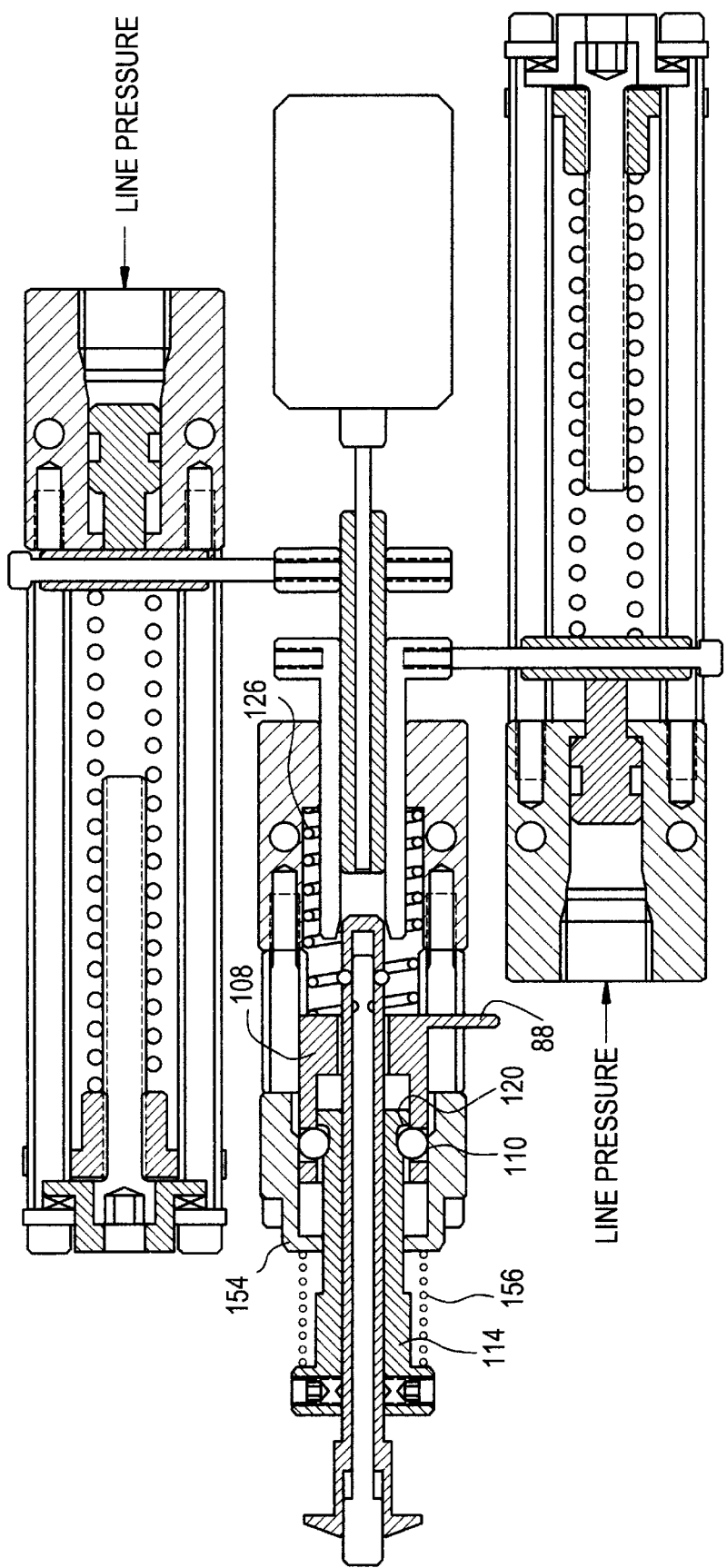
FIG. 8 is the view of FIG. 4, showing how the system trips responsive to a fire in the vicinity.

Referring to FIG. 8, the eutectic trip is illustrated. If there is a fire in the vicinity of the emergency shutdown system 90, the eutectic material 158 shown in FIG. 4 liberates the spring 156 to act on clutch release sleeve 114. Bracing off body 152, the spring 156 pushes the clutch release sleeve 114 to the left, thus bringing grooves 120 into alignment with balls 110. This allows balls 110 to retract away from shoulder 124. When this occurs, the spring 126 is able to bias the no longer locked tripping sleeve 108 to the left, thus moving tab 88 against tab 86 for a shutdown in the manner previously described.

Figure 12:
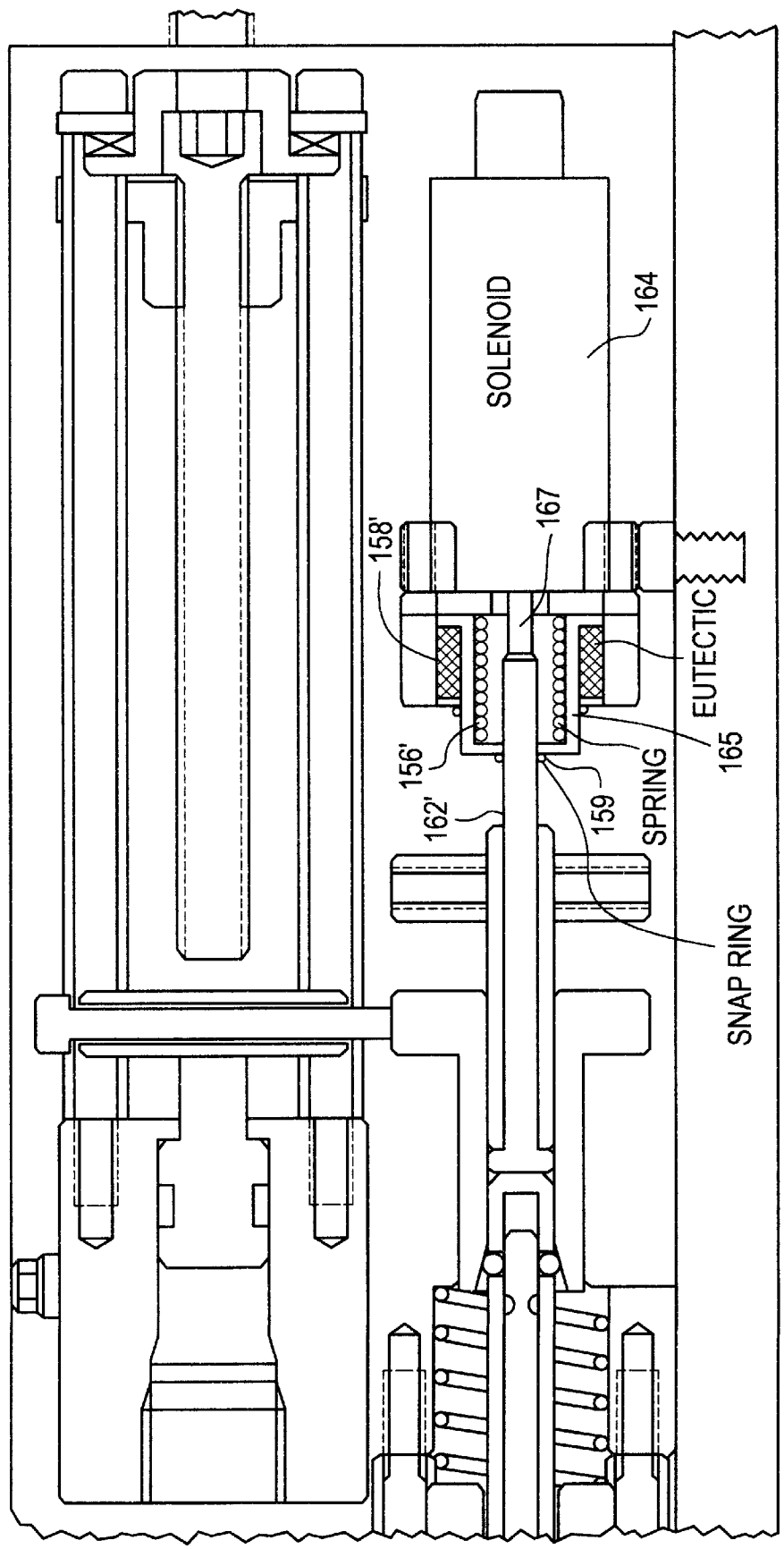
FIG. 12 is an alternative embodiment, illustrating in section view the combining of the mechanisms for shutdown with a solenoid and shutdown in response to a fire, using eutectic material, where both mechanisms direct the actuator to the failsafe position using the same rod.

Referring to FIG. 12, spring 156' acts on sleeve 165 which, in turn, bears on snap ring 159 to move trip rod 162'. The eutectic material 158' holds back a spring force on sleeve 165 from spring 156' until sufficient heat in the area due to a fire removes the eutectic material 158', thereby allowing spring 156' to move sleeve 165 against snap ring 159 on plunger 162'. It should be noted that the solenoid rod 167 abuts the plunger 162' so that the solenoid 164 can independently actuate the emergency shutdown to the fail-safe position.

Figure 9:
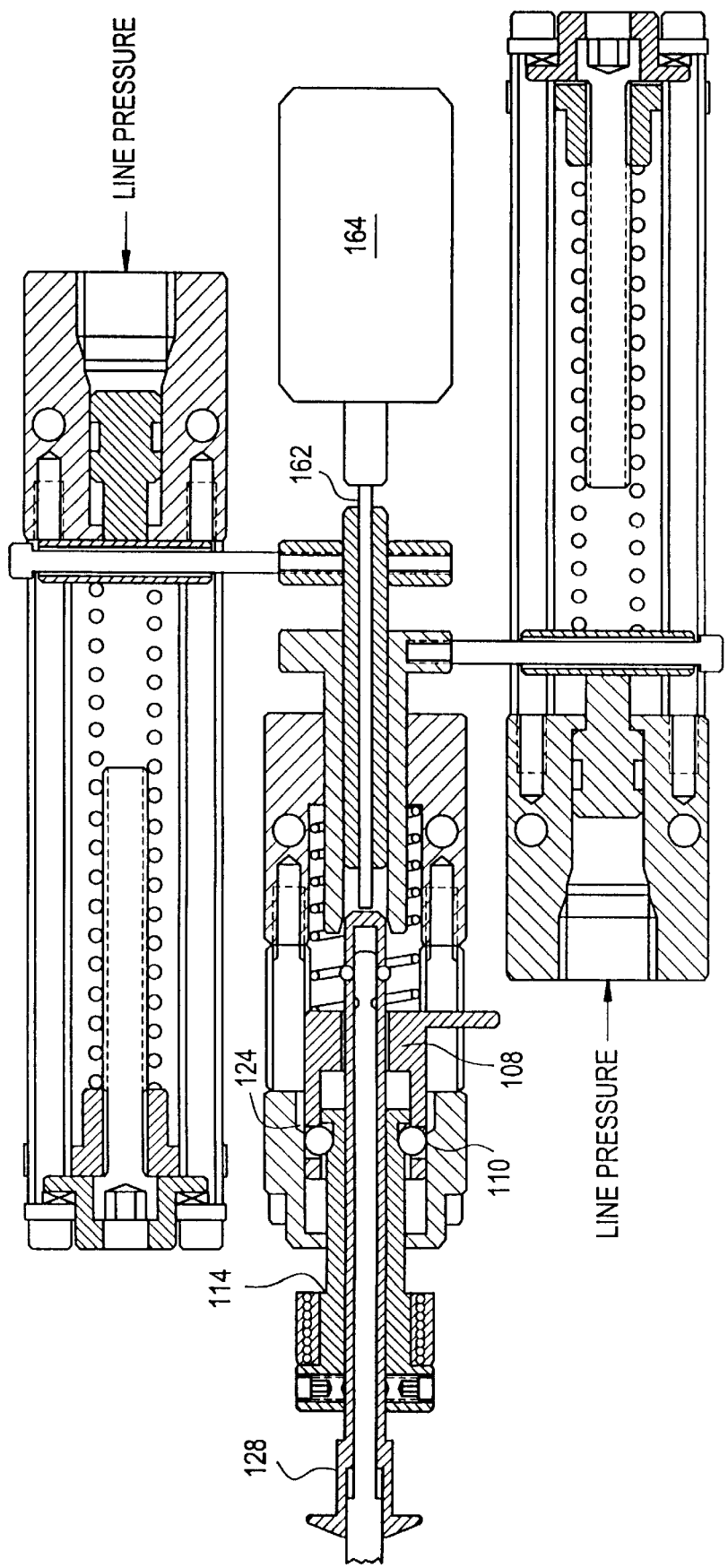
FIG. 9 is the view of FIG. 4, showing how a solenoid-powered plunger can be used to remotely trip the valve attached to the actuator as shown in FIG. 1.

Yet another way to shut down the passage 12 in the valve illustrated is shown in FIG. 9. The solenoid 164 is actuated to move the trip rod 162 to the left against ball lock pin 128. Rod 162 displaces ball lock pin 128 to the left which takes with it clutch release sleeve 114, which allows the balls 110 to retract away from shoulder 124, thus allowing the tripping sleeve 108 to move to the left. This takes tab 88 against tab 86 for a release in the manner described previously. The return spring 22 now can move the gate 14 to the closed position.

Those skilled in the art can now appreciate the advantages of the preferred embodiment illustrated in FIGS. 1–9. A torsion spring 80 is at the heart of the clutching system to allow for manual opening of the valve by a counterclockwise rotation of drive cap 42. Clockwise movement of the components connected to ball nut 40 is prevented unless the tab 86 is moved by tab 88. The emergency shutdown system 90, which is responsible for moving tab 86, puts the valve in a closed position. The dampener rod 94 acts to regulate the closure rate of passage 12 with gate 14. Closure occurs without rotation of drive cap 42 because pin 44 is not in engagement with adapter stem 48 when the clockwise rotation of ball nut 40 occurs at the urging of closure spring 22. This is a safety feature which prevents injury to those standing near the handwheel that would normally be secured to drive cap 42. The advantages of the emergency shutdown system 90 are clearly seen from FIGS. 4–9. Independently operating high and low trips are provided. Auxiliary trips, such as by solenoid 164 or eutectic material 158, are also available. The emergency shutdown system 90 can be reset independently of the setpoints for the high and low trips. The amount of force required to move the tripping sleeve 108 so as to shift tab 86 is independent of the pressure in passage 12 of the valve body. Thus, spring 126 can be a fairly weak spring. Resetting the emergency shutdown system 90 is possible, regardless of the closeness of the high- and low-pressure trip points. External access to springs 178 and 178' allows for easy adjustment of the high- and low-pressure setpoints. Auxiliary electrical or hydraulic systems are not required for normal high- and low-pressure tripping options. The design is compact and simple, assuring a long period of maintenance-free operation. A manual trip option is available by simply providing a pull to the left on ball lock pin 128.

Figure 10:
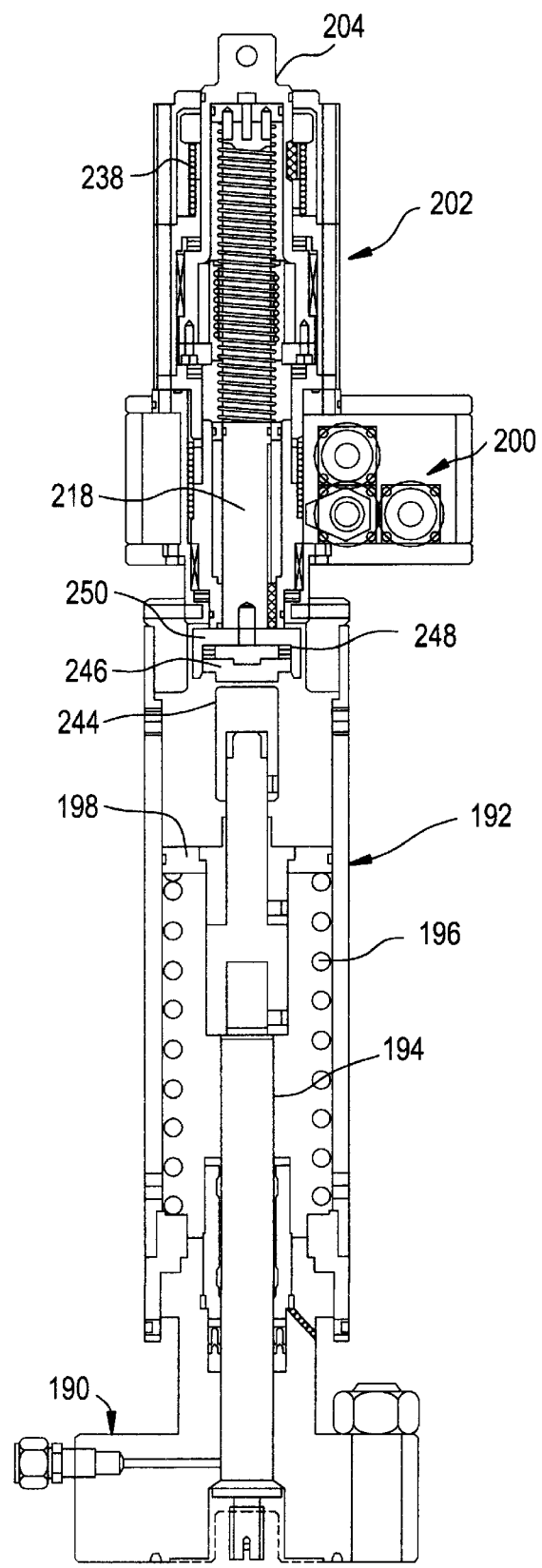
FIG. 10 illustrates an alternative embodiment for a normal actuation of the valve from the open to the closed position.
Figure 11:
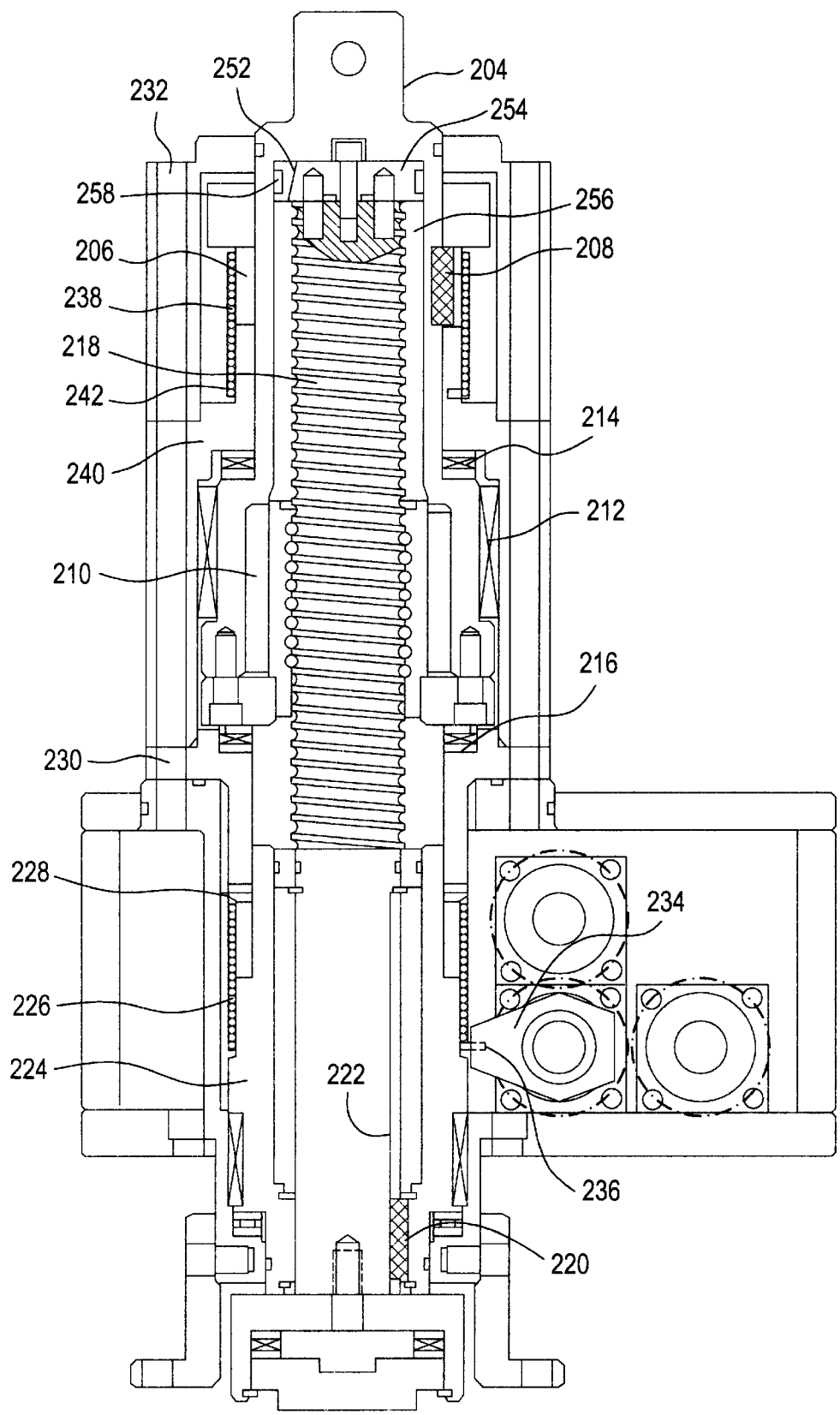
FIG. 11 is a detailed view of FIG. 10, illustrating the stem corresponding to the valve-closed position and showing the tripping system engaged to the lower of two torsion spring/clutch devices employed in this embodiment.

Referring now to FIGS. 10 and 11, an alternative embodiment is illustrated. In FIG. 10, there is a partial illustration of the valve body 190 to provide a frame of reference. An actuator assembly 192 is mounted above it. A stem 194 extends through body 190 and into the actuator assembly 192. A return spring 196 acts on plate 198 to bias the stem 194 upwardly to close the valve. An emergency shutdown system 200 is illustrated, and for all intents and purposes, functions identically to the shutdown system 90 previously described. The actuation system 202 is mounted adjacent the emergency shutdown system 200 and operates in a slightly different manner than described in the preferred embodiment. The detailed operation of the actuation system 202 can be better seen from a review of FIG. 11. A drive cap assembly 204 is secured to rotor 206 by key 208. Drive cap assembly 204 supports the ball nut 210. Radial bearings 212 support the drive cap assembly 204 when rotated. Thrust bearings 214 and 216 also support the drive cap assembly 204 against longitudinal movement in both directions. A screw shaft 218 engages the ball nut 210. A key 220 extends into groove 222 to ensure that the screw shaft 218 moves longitudinally with respect to shutdown sleeve 224 and does not rotate as long as key 220 remains fixed. Key 220 is secured to shutdown sleeve 224. Torsion spring 226 is supported at end 228 on sleeve 230. Sleeve 230 does not rotate as it is part of the body of the actuator system 202 and is secured by through-bolts (not shown) inserted in openings 232. A portion of torsion spring 226 contacts shutdown sleeve 224 in order to allow clockwise rotation but to prevent counterclockwise rotation of shutdown sleeve 224. In order to allow the shutdown sleeve 224 to rotate in a counterclockwise direction, the emergency shutdown system 200 needs to be actuated in a manner described before so that tab 234 can push tab 236 on torsion spring 226 to increase its diameter, thus permitting shutdown sleeve 224 to rotate in a counterclockwise direction.

Torsion spring 238 is disposed over rotor 206 as well as sleeve 240, which is stationary. The lower end 242 of torsion spring 238 is connected to sleeve 240. The upper end of torsion spring 238 covers the rotor 206. The torsion spring 238 permits counterclockwise rotation of drive cap assembly 204, which turns with rotor 206 but precludes clockwise rotation. Counterclockwise rotation of drive cap assembly 204 turns the ball nut 210 counterclockwise and translates the screw shaft 218 downwardly to open the valve. As previously suggested, rotation in a clockwise direction of drive cap assembly 204 is precluded by torsion spring 238. However, torsion spring 226 retains shutdown sleeve 224 against counterclockwise rotation. Accordingly, the screw shaft 218 can translate under the guidance of key 220 extending into groove 222 on the screw shaft 218. Referring back to FIG. 10, downward movement of the screw shaft 218 eventually results in a contact with stem 194 at its upper end 244. Plate 246 is supported by a thrust bearing 248 at the lower end 250 of screw shaft 218. Return spring 196 is always exerting an upward force against screw shaft 218.

Thus, when the valve is in the fully open position representing complete downward movement of screw shaft 218 responsive to a counterclockwise rotation of drive cap assembly 204, the emergency shutdown system 200 can allow the valve to close rapidly. Actuation of the various trip mechanisms previously described for shutdown system 90 will result in movement of tab 236 so as to increase the diameter of torsion spring 226. When this happens, shutdown sleeve 224 can rotate counterclockwise with screw shaft 218. A closure spring 196 puts an upward force on stem 194, which in turn puts an upward force on screw shaft 218. At this time, torsion spring 238 holds the drive cap assembly 204 as well as the ball nut 210 against clockwise rotation. This is because torsion spring 238 only permits counterclockwise rotation and always precludes clockwise rotation. Accordingly, with the ball nut 210 held against clockwise rotation and an upward force being applied to screw shaft 218, screw shaft 218 will turn counterclockwise with shutdown sleeve 224, which is now released for counterclockwise rotation due to the actuation of the shutdown system 200. With the ball nut 210 retained against clockwise rotation, counterclockwise rotation of the screw shaft 218 will cause it to rise with respect to the ball nut 210, thus closing the valve.

The rate of such closure is controlled by an orifice 252 in plate 254 which is sealed in bore 256 by a seal 258. The opening of the valve by counterclockwise rotation of drive cap assembly 204 occurs at a slow enough rate where the size of the orifice 252 does not materially impede the rate at which the valve can be opened.

It should be noted that torsion spring 238 holds the drive cap assembly 204 stationary as the valve is being closed so as to preclude injury to personnel in the vicinity of any handwheel (not shown) which can be attached to the drive cap assembly 204.

Thus, the difference in the embodiment shown in FIGS. 10 and 11 is that a pair of torsion springs 238 and 226 are used. The upper torsion spring 238 merely ensures that the drive cap assembly 204 can only be turned counterclockwise and serves the purpose of bracing the ball nut 210 against clockwise rotation. The lower torsion spring 226 secures the shutdown sleeve 224 against counterclockwise rotation to facilitate the translation of the screw shaft 218 guided by key 220. When it comes time for shutdown, tab 236 is displaced and return spring 196 provides an upward force on screw shaft 218. Screw shaft 218 can then rotate with shutdown sleeve 224 in a counterclockwise direction due to an increase in the diameter of torsion spring 226 as a result of movement of tab 236. With the ball nut 210 braced against clockwise rotation, counterclockwise rotation of screw shaft 218 allows it to translate upwardly with respect to ball nut 210 as a result of its counterclockwise rotation to allow the valve to close.

The foregoing disclosure and description of the invention are illustrative and explanatory thereof, and various changes in the size, shape and materials, as well as in the details of the illustrated construction, may be made without departing from the spirit of the invention.

What is claimed:

1. A valve actuator for a valve in a line, comprising:

a housing;

a shaft mounted to said housing for movement between an open and closed position corresponding to the open and closed position of a valve to which the actuator can be mounted;

a drive assembly to move said shaft between said open and closed positions;

a biasing member acting on said shaft to urge it toward one of said open or closed positions known as the failsafe position;

a shutdown system to selectively release said shaft from the position in which it was placed by said drive assembly to allow said biasing member to urge said shaft toward said failsafe position, said shutdown system comprising:

a shutdown housing;

a tripping member movably mounted in said shutdown housing and operably connected to said drive assembly;

independently operating high- and low-pressure trip assemblies, each operably connected to said tripping member for actuation of said tripping member when pressure in the line is outside a predetermined pressure range.

2. A valve actuator for a valve in a line, comprising:

a housing;

a shaft mounted to said housing for movement between an open and closed position corresponding to the open and closed position of a valve to which the actuator can be mounted;

a drive assembly to move said shaft between said open and closed positions;

a biasing member acting on said shaft to urge it toward one of said open or closed positions known as the failsafe position;

a shutdown system to selectively release said shaft from the position in which it was placed by said drive assembly to allow said biasing member to urge said shaft toward said failsafe position, said shutdown system comprising:

a shutdown housing;

a tripping member movably mounted in said shutdown housing and operably connected to said drive assembly;

independently operating high- and low-pressure trip assemblies, each operably connected to said tripping member for actuation of said tripping member when pressure in the line is outside a predetermined pressure range;

said high-pressure trip assembly comprises a first release member movably mounted in said shutdown housing for selective tandem movement with said tripping member when line pressure exceeds a predetermined level;

said low-pressure trip assembly comprises a second release member movably mounted in said shutdown housing for selective tandem movement with said tripping member when line pressure is below a predetermined level.

3. The actuator of claim 2, wherein:

said first and second release members are in a nested relationship.

4. The actuator of claim 3, wherein:

said tripping member comprises a projection in contact with one of said first and second release members, while the other of said first and second release members abuts an end of said tripping member.

5. The actuator of claim 4, further comprising:

a trip rod extending through said release member which is in contact with said end of said tripping member, said trip rod selectively actuable to move said tripping member independently of operation of said high- and low-pressure trip assemblies.

6. The actuator of claim 5, wherein:

said trip rod is actuated by a solenoid.

7. The actuator of claim 1, further comprising:

a biased tripping sleeve mounted to said shutdown housing and operably connected to said drive assembly;

said tripping member connected to a release sleeve movable from a set position, where said tripping sleeve is prevented by said release sleeve from movement in response to said bias, to a tripped position, where said bias can move said tripping sleeve to allow said shaft, in turn, to move to said failsafe position.

8. The actuator of claim 7, wherein:

said tripping sleeve comprises at least one ball extending outwardly through a lateral opening in said tripping sleeve, said release sleeve comprises a support surface and a groove, whereupon said support surface locks said ball to said shutdown housing while said groove, when aligned with said ball, allows movement of said tripping sleeve responsive to said bias.

9. The actuator of claim 4, further comprising:

a biased tripping sleeve mounted to said shutdown housing and operably connected to said drive assembly;

said tripping member connected to a release sleeve movable from a set position, where said tripping sleeve is prevented by said release sleeve from movement in response to said bias, to a tripped position, where said bias can move said tripping sleeve to allow said shaft, in turn, to move to said failsafe position.

10. The actuator of claim 9, wherein:

said tripping sleeve comprises at least one ball extending outwardly through a lateral opening in said tripping sleeve, said release sleeve comprises a support surface and a groove, whereupon said support surface locks said ball to said shutdown housing while said groove, when aligned with said ball, allows movement of said tripping sleeve responsive to said bias.

11. The actuator of claim 9, wherein:

said first release member abuts said end of said tripping member;

said second release member is mounted over said first release member and in contact with said projection on said tripping member;

said tripping member comprises an internal passage with a movable plunger therein;

said projection comprises at least one ball supported in a lateral opening by said plunger.

12. The actuator of claim 11, wherein:

said plunger comprising a groove which can be selectively positioned in alignment with said ball on said tripping member to allow reset of said shutdown system by allowing said tripping member to move with respect to said second release member sufficiently to allow said tripping sleeve to be relocked to said shutdown housing while pressure is built up in the line.

* * * * *